United States Patent [19]

Chan

[11] Patent Number: 5,248,411
[45] Date of Patent: Sep. 28, 1993

[54] APPARATUS AND PROCESS FOR WITHDRAWING STRIPPER GAS FROM AN FCC REACTOR VESSEL

[75] Inventor: Ting Y. Chan, Houston, Tex.

[73] Assignee: Texaco Inc., White Plains, N.Y.

[21] Appl. No.: 811,729

[22] Filed: Dec. 23, 1991

Related U.S. Application Data

[63] Continuation-in-part of Ser. No. 620,114, Nov. 30, 1990, abandoned.

[51] Int. Cl.⁵ .................................... F02M 29/10
[52] U.S. Cl. ............................ 208/161; 55/459.1; 208/113; 208/153; 422/144; 422/145; 422/147; 422/214
[58] Field of Search ........................ 422/144-145, 422/147; 55/459.1; 208/113, 161, 153

[56] References Cited

U.S. PATENT DOCUMENTS

| | | | |
|---|---|---|---|
| 1,265,763 | 5/1918 | Fender | 55/451 |
| 3,064,811 | 11/1962 | Mumper | 209/144 |
| 3,661,799 | 5/1972 | Cartmell | 252/417 |
| 4,229,194 | 10/1980 | Baillie | 55/459.1 X |
| 4,251,243 | 2/1981 | Salete-Garces | 55/459.1 X |
| 4,279,743 | 7/1981 | Miller | 209/211 |
| 4,303,421 | 12/1981 | Cerroni | 55/459.1 X |
| 4,464,264 | 8/1984 | Carroll | 210/512.1 |
| 4,502,947 | 3/1985 | Haddad et al. | 422/147 X |
| 4,623,446 | 11/1986 | Haddad et al. | 208/113 |
| 4,654,060 | 3/1987 | Haddad et al. | 55/424 |
| 4,696,737 | 9/1987 | Bouchillon | 209/210 |
| 4,737,346 | 4/1988 | Haddad et al. | 422/144 |
| 4,842,145 | 6/1989 | Boadway | 209/144 |
| 4,909,993 | 3/1990 | Haddad et al. | 422/144 |
| 5,002,671 | 3/1991 | de Villiers et al. | 55/459.1 |

*Primary Examiner*—James C. Housel
*Assistant Examiner*—Amalia Santiago
*Attorney, Agent, or Firm*—James L. Bailey; Kenneth R. Priem; Richard A. Morgan

[57] ABSTRACT

A riser cyclone separator for rapidly separating catalyst from cracked hydrocarbon vapors in a fluid catalytic cracking process. The riser cyclone is provided with an annular port for drawing stripping gas into the riser cyclone to separate entrained catalyst and vent stripper gas from the regenerator vessel. The cyclone is inherently negative pressure to the reactor vessel.

10 Claims, 2 Drawing Sheets

APPARATUS AND PROCESS FOR WITHDRAWING STRIPPER GAS FROM AN FCC REACTOR VESSEL

CROSS REFERENCE TO RELATED APPLICATION

This application is a continuation-in-part of Ser. No. 07/620,114 filed Nov. 30, 1990, for Apparatus For Withdrawing Stripping Gas From An FCCU Reactor Vessel to T. Y. Chan, abandoned.

BACKGROUND OF THE INVENTION

1. Field of the Invention

This invention relates to an apparatus for rapidly separating catalyst from a cracked hydrocarbon gas in a fluidized catalytic cracking (FCC) unit. The invention is also a process for withdrawing stripper gas from an FCC reactor vessel.

2. Related Apparatus and Methods in the Field

The fluid catalytic cracking (FCC) process comprises mixing hot regenerated catalyst with a hydrocarbon feedstock in a transfer line riser reactor under catalytic cracking reaction conditions. The feedstock is cracked to yield gasoline boiling range hydrocarbon as well as degradation products, such as coke which deposits on the catalyst causing a reduction in catalytic activity. Hydrocarbon vapor and coked catalyst are passed from the top of the riser reactor directly to a separator vessel wherein catalyst is separated from hydrocarbon. In the FCC art, the separator vessel is termed the reactor vessel. The separated catalyst is passed to a stripper wherein it is contacted with a stripping gas to remove volatile hydrocarbon. Stripped catalyst is then passed to a separate regeneration vessel wherein coke is removed from the catalyst by oxidation at a controlled rate. Catalyst, substantially freed of coke, is collected in a vertically oriented regenerated catalyst standpipe. The catalyst is passed from the standpipe to the riser reactor for cyclic reuse in the process.

A conventional feedstock comprises any of the hydrocarbon fractions known to yield a liquid fuel boiling range fraction. These feedstocks include light and heavy gas oils, diesel, atmospheric residuum, vacuum residuum, naphtha such as low grade naphtha, coker gasoline, visbreaker gasoline and like fractions from steam cracking.

Catalyst development has improved the fluid catalytic cracking (FCC) process. The fluid catalytic cracking process has been modified to take advantage of high activity catalysts, particularly crystalline zeolite cracking catalysts, to take advantage of the high activity, selectivity and feedstock sensitivity of these catalysts. These high activity catalysts has been used to improve the yield of more desirable products from feedstocks.

The hydrocarbon conversion catalyst employed in an FCC process is preferably a high activity crystalline zeolite catalyst of a fluidizable particle size. The catalyst is transferred in suspension or dispersion with a hydrocarbon feedstock, upwardly through one or more riser conversion zones which provide a hydrocarbon residence time in each conversion zone in the range of 0.5 to about 10 seconds, typically less than about 8 seconds. High temperature riser hydrocarbon conversions, occurring at temperatures of at least 900° F. up to about 1450° F., pressures of 5 psig to 45 psig and at 0.5 to 4 seconds hydrocarbon catalyst residence time in the riser are desirable. The vaporous hydrocarbon conversion product is rapidly separated from the catalyst.

Rapid separation of catalyst from hydrocarbon product is particularly desirable to constrain hydrocarbon conversion time to the residence time in the conversion zone. During the hydrocarbon conversion, coke accumulates on the catalyst particles and entrains hydrocarbon vapors. Entrained hydrocarbon contact with the catalyst continues after removal from the hydrocarbon conversion zone until the hydrocarbon is separated from the catalyst. The separation is typically by cyclone separating followed by stripping the catalyst with a stripping gas to remove volatizable hydrocarbon. Hydrocarbon conversion products and stripped hydrocarbon are combined and passed to a fractionation and vapor recovery system. This system comprises a fractionation tower, vapor coolers and wet gas compressor operated at a suction pressure of 0.5 to 10 psig. Stripped catalyst containing deactivating amounts of coke, is passed to a catalyst regeneration zone.

Cyclone separators are used to separate fluidized catalyst particles from cracked hydrocarbon. In a typical cyclone separator, a suspension of hydrocarbon vapor and entrained finely divided solid particulate catalyst is introduced tangentially into the separator barrel. In the barrel a spiral, centrifugal motion causes the solid particles to be thrown to the wall of the cyclone separator where they flow downward under the force of gravity to a catalyst bed. Separated vapor is removed through an axial vapor withdrawal conduit extending below the tangential inlet conduit upwardly through the top of the cyclone separator. A vapor recovery system, in fluid communication with the vapor withdrawal conduit, is maintained at reduced pressure to assist the withdrawal of vapor from the cyclone separator.

An object of the present invention is to provide an apparatus particularly suited for rapidly separating the catalyst-hydrocarbon suspension. Another object is to establish a stable pressure gradient between the cyclone barrel and the reactor vessel to facilitate removing stripper gas from the reactor vessel. Another object of this invention is to provide a cyclone separator apparatus which withstands thermal expansions.

Perry's Chemical Engineers, Handbook, 4th ed., pp. 20–68 to 20–71 describes general design parameters for cyclone separators used for removing solid particles from vapors.

Kirk-Othmer Encyclopedia, 3rd ed., Vol. 1, pp. 667 to 672 describes general design parameters for cyclone separators used for separating solid particles from gases.

U.S. Pat. Nos. 4,623,446 and 4,737,346 to J. H. Haddad et al. teach a closed coupled cyclone separator system in the reactor vessel of a fluid catalytic cracking apparatus. Means is provided for blending stripping gas with cracked hydrocarbon as it flows to a directly coupled riser cyclone separator. As shown in FIG. 7 and 8, the riser reactor conduit is modified to comprise an overlapping downstream portion 118 to provide an annulus between the upstream portion 117 and the downstream portion 118. The annulus is covered by a flat metal ring having orifices 125 in open communication with the reactor vessel, enabling stripping gas to pass into the downstream conduit 118. A riser cyclone dipleg is sized, as seen in FIG. 5, to admit at least a portion of stripping gas from the stripping zone to pass countercurrent to catalyst passing downwardly through the dipleg.

U.S. Pat. No. 4,502,947 to Haddad et al. discloses a closed cyclone fluid catalytic cracking catalyst separation method and apparatus. In the closed cyclone, hydrocarbon product and catalyst are passed directly into a cyclone separator from a riser without passing into the atmosphere of the reactor vessel. Avoiding the atmosphere of the reactor vessel reduces both excess catalytic cracking and high temperature thermal cracking.

BRIEF SUMMARY OF THE INVENTION

The invention is an apparatus for the fluid catalytic cracking of a hydrocarbon feedstock. The apparatus comprises a vertically elongated tubular riser reactor having an upstream end and a downstream end, the downstream end terminating within the reactor vessel. Means is provided for introducing a suspension of hydrocarbon feedstock and catalyst into an upstream end of the riser reactor wherein the hydrocarbon feedstock undergoes cracking reactions. The cracked hydrocarbon feed and catalyst mixture exits from the downstream end of the riser reactor. A first conduit connects the downstream end of the riser reactor directly to a riser (first) cyclone separator contained within the reactor vessel.

In the riser (first) cyclone separator, an inlet duct discharges into a vertically elongated cylindrical barrel. The base of the barrel is attached to an inverted conical member which attaches to a vertically elongated catalyst dipleg for conducting catalyst from the barrel to a catalyst stripper. The stripper comprises means for containing a stripping zone in the reactor vessel and means for introducing stripping gas.

The upper end of the barrel has a top cover with an annular port. The annular port is axially aligned with the barrel and provides fluid communication between the reactor vessel and the barrel. A vertically oriented outlet conduit axially aligned with the barrel traverses the cover through the center of the port. The outlet conduit provides fluid communication for cracked hydrocarbon out of the reactor vessel by way of a secondary cyclone separator.

DETAILED DESCRIPTION OF THE INVENTION

Figure 1:
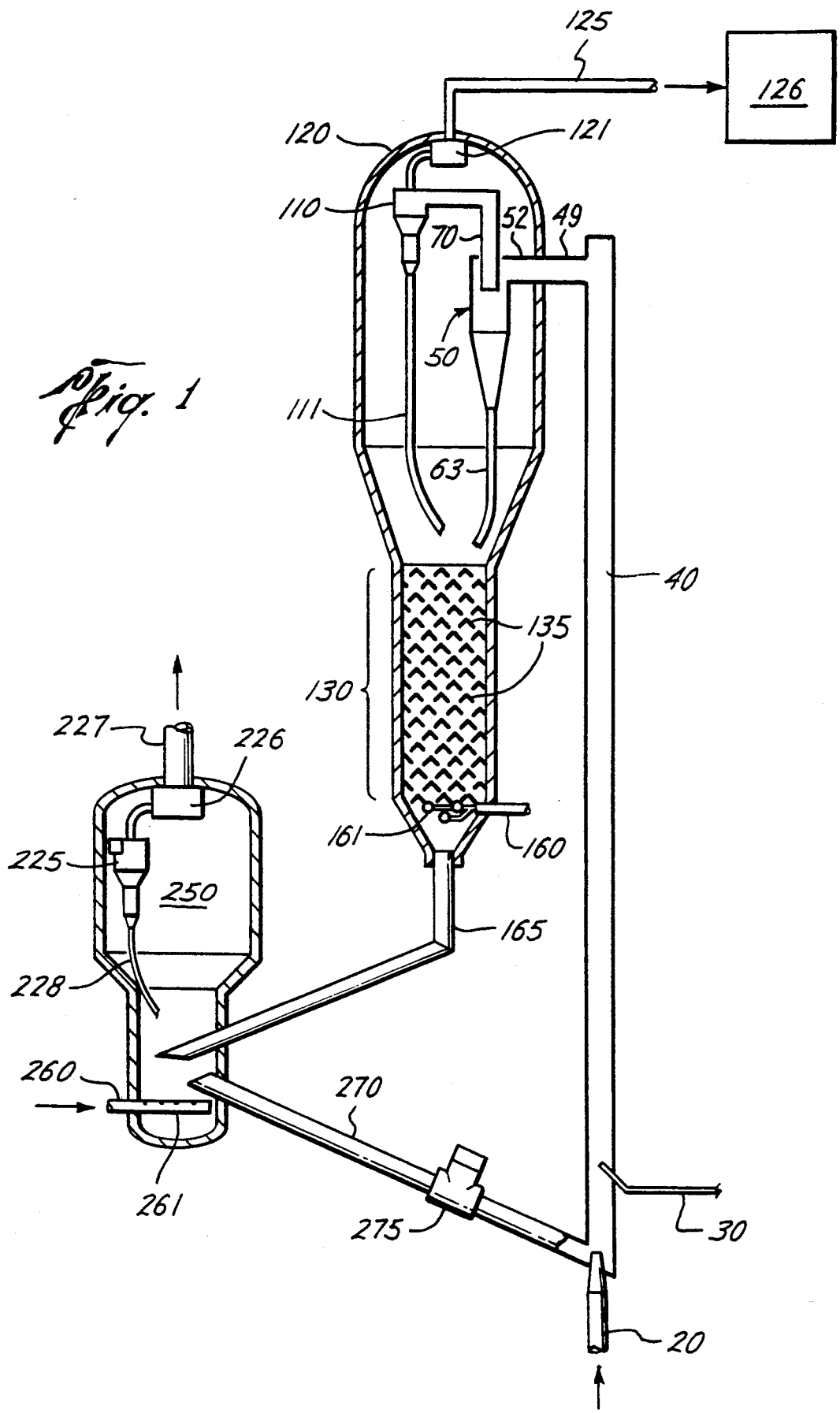
FIG. 1 is a diagrammatic arrangement of a fluid catalytic cracking apparatus comprising a riser reactor, a reactor vessel, a catalyst stripper and a regenerator.

Reference is made to FIG. 1 which is representative of an apparatus for contacting a hydrocarbon oil feedstock with finely divided fluidized catalyst in riser reactor 40 at catalytic cracking conditions. A clean, freshly regenerated catalyst is delivered from regenerated catalyst standpipe 270 into the lower portion of riser reactor 40. The regenerated catalyst has a carbon content less than about 0.1 wt% and an ASTM microactivity of 60 to 70 by ASTM D-3907 Microactivity Test (MAT) or the equivalent. As the catalyst enters the riser, its temperature is decreased from that of the regenerator by the addition of a fluidization medium delivered through line 20. The fluidization medium may be steam, nitrogen or low molecular weight hydrocarbons such as methane, ethane, ethylene or fuel gas. The amount of fluidization medium must be sufficient to move the fluid zeolite catalyst from the base of riser 40 to the injection point of hydrocarbon feedstock. A feedstock, such as vacuum gas oil (VGO) having a boiling range of about 400° F. to 1000° F. is delivered to riser reactor 40 through conduit 30. The VGO enters the riser by way of an injection nozzle (not shown) which may be a single nozzle or an arrangement of more than one nozzle which mixes oil and catalyst quickly and completely after injection. The amount of catalyst circulated must be enough to completely vaporize and crack the feedstock to products including gas, low boiling liquids and fuel boiling range liquids such as gasoline and light cycle gas oil. Cracking temperature is 900° F. to 1450° F., typically 980° F. to 1025° F. at 5 psig to 45 psig, typically 10 psig to 30 psig. The mixture of products and unconverted gas oil vapor have sufficient velocity to transport the fluid catalyst upwardly through the riser 40.

The mixture of catalyst and oil vapors moves upwardly in riser 40. The riser conversion zone comprises the internal volume of the riser from the lower injection point to riser cyclone 50 including transitional member 49 and inlet conduit 52. Riser (first) cyclone 50 is closed coupled with riser 40. Transitional member 49 and inlet conduit 52 are both enclosed and they completely separate the flowing cracked hydrocarbon vapor from the atmosphere of the reactor vessel. In a closed coupled cyclone separator, all of the reaction mixture flows directly from the riser reactor into the riser (first) cyclone separator.

The hydrocarbon vapors are removed through riser (first) cyclone 50, outlet conduit 70, secondary cyclone 110 and plenum 121 and are transported through a conduit 125 to fractionation and vapor recovery system 126. As previously stated, vapor recovery system 126 comprises a wet gas compressor having a suction pressure termed the vapor recovery pressure of 0.5 to 10 psig, typically 2 to 5 psig. Entrained catalyst is separated in riser cyclone 50 and secondary cyclone 110 and falls to a lower portion of the reactor vessel 120 through diplegs 63 and 111. The diplegs are optionally sealed by sealing means (not shown) such as J-valves, trickle valves or flapper valves.

The catalyst flows into the stripper 130 containing baffles 135 or other means to contact the catalyst and stripping gas. The stripping gas may be nitrogen, steam or other suitable material delivered by conduit 160 to distributor 161. Distributor 161 uniformly disperses the stripping gas into the stripper 130 to strip volatile and volatizable hydrocarbons from the catalyst. Stripped hydrocarbons and stripping gas flow through port 68 in riser cyclone separator 50, shown in FIG. 2 and out reactor vessel 120 with the cracked hydrocarbon product vapors through riser (first) cyclone 50, outlet conduit 70, secondary cyclone separator 110, plenum 121 and conduit 125. Secondary cyclone separator 110 is representative of one, two or more cyclone separators in series.

The stripped catalyst leaves stripper 130 and flows to the regenerator 250 by way of spent catalyst standpipe 165. The regenerator 250 contains both a lower dense phase bed of catalyst and an upper dilute phase dispersion of catalyst. Stripped catalyst is uniformly distributed across the upper surface of the dense phase bed. Most of the coke is removed in the dense phase bed. A combustion medium of air or oxygen and nitrogen is delivered by conduit 260 to a distribution device 261 to mix combustion medium and coked catalyst. Coke is burned from the catalyst by means of the combustion medium to yield flue gas containing amounts of $CO_2$, $SO_2$, and $NO_x$. The combustion of the coke to $CO_2$ is preferably carried out at a regenerator temperature above about 1150° F. and below about 1450° F. A combustion promoter such as platinum residing on the catalyst improves the combustion so that 0.1 wt% or less residual carbon is left on the catalyst at these conditions. The flue gas passes through the regenerator dilute phase, cyclone 225, plenum 226 and flue gas line 227 for further processing. As the flue gas passes through the cyclone, catalyst is separated and returned to the dense phase bed by way of dipleg 228. The regenerated catalyst flows from the dense phase bed to regenerated catalyst standpipe 270. Slide valve 275 regulates the flow of regenerated catalyst from standpipe 270 to riser 40.

Figure 2:
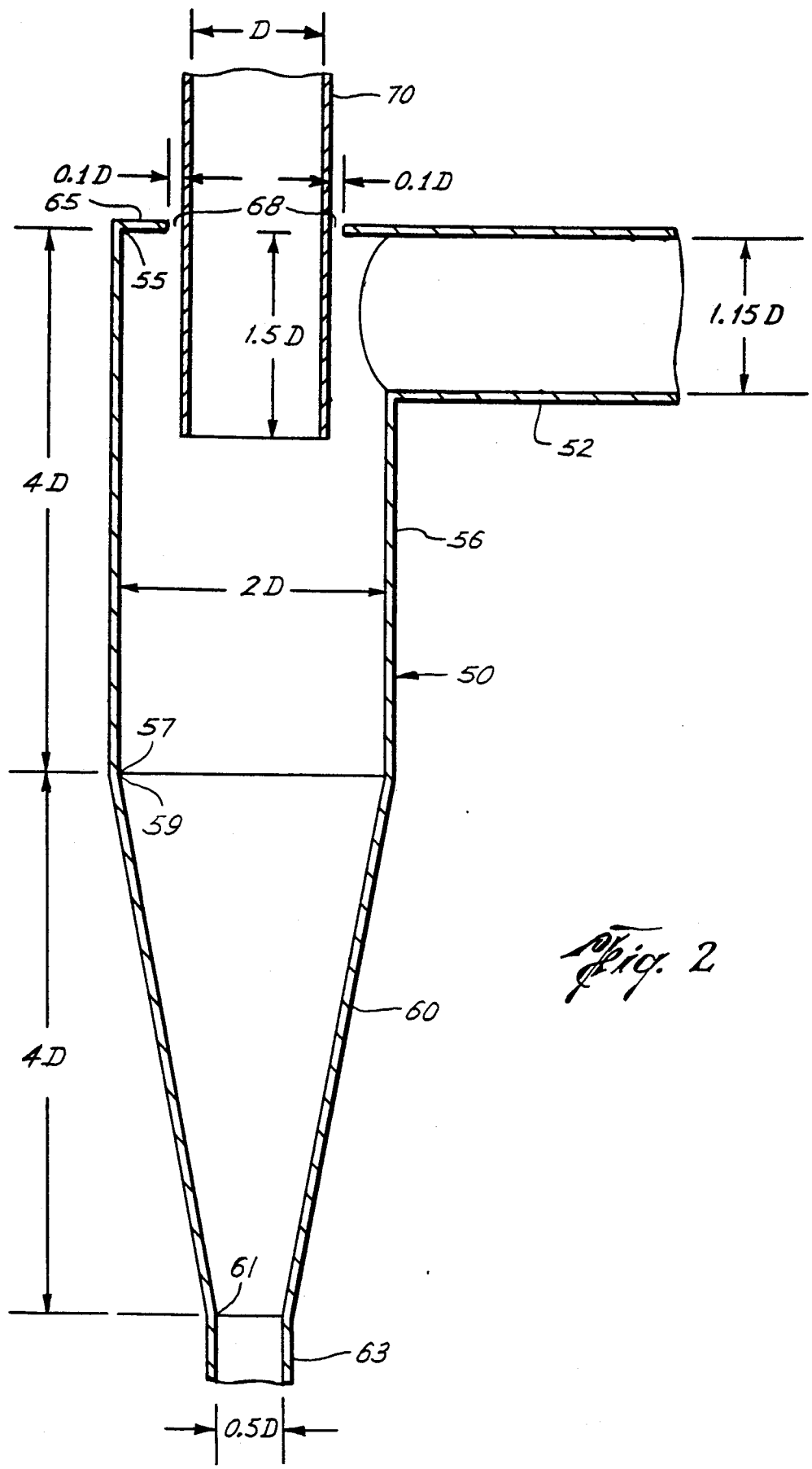
FIG. 2 is a proportional side view of a riser cyclone separator.

Reference is additionally made to FIG. 2, a proportional representation of riser cyclone 50. The component parts of riser cyclone 50 are proportioned in the drawing relative to outlet conduit 70 diameter D which is the diameter required to pass the volume of flowing product vapors and stripping gas. In industrial practice this is a 12 to 60 inch diameter conduit. Inlet conduit 52 is attached to transitional member 49 of riser reactor 40 and provides direct fluid communication between the riser reactor 40 and riser cyclone separator 50. Inlet conduit 52 is structural support for riser cyclone 50 in reactor vessel 120. Inlet conduit 52 has a diameter 1.15D.

Inlet conduit 52 provides tangential discharge into barrel 56. Barrel 56 is vertically elongated cylindrical barrel extending a distance 4D from upper end 55 to lower end 57. Barrel 56 has a cylindrical diameter 2D.

A vertically oriented, right cylindrical conical member 60 extends a vertical distance 4D from an upper base end 59 to a truncated apex end 61. Conical member 60 is inverted so that base end 59 is above apex end 61. The upper base end 59 has a diameter 2D to mate with and join barrel lower end 57. Truncated apex end 61 is directly attached to and in fluid communication with dipleg 63 of diameter 0.5D. Dipleg 63 provides for the flow of separated catalyst to stripping zone 130.

Barrel upper end 55 is attached to top cover 65 which has an outside diameter 2D, the same as that of barrel 56. Port 68 in cover 65 is axially aligned with barrel 56 and provides for the flow of stripper ga from stripper 130 into barrel 56.

Outlet conduit 70 traverses cover 65 through the center of annular port 68 and extends a distance 1.5D below cover 65 into barrel 56. Annular port 68 has an inner diameter larger than the outside diameter of outlet conduit 70, providing an annular gap of 0.1D between the outer diameter of outlet conduit 70 and cover 65.

The pressure in a fluid catalytic cracking reactor vessel ranges between 0.5 psig and 45 psig, with 35 psig being typical in current practice. The pressure in an open riser cyclone is greater than that of the reactor vessel. In contrast, the pressure in a closed coupled cyclone is lower than that of the reactor vessel. Inside a closed coupled riser cyclone the pressure is typically 0.1 to 2 psi below that of the reactor vessel. This pressure gradient caused by the lower pressure of the vapor recovery system 126 in flow communication with outlet conduit 70. This 0.1 to 2 psi pressure differential is the motive force which draws stripper gas into the riser (first) cyclone. Typically, stripping gas flows through two stages of cyclone separation, shown in FIG. 1, as it is removed from the reactor vessel.

The dimensions of the port 68 are calculated from the sharp edge orifice equation.

$$\Delta P_{gap} = \frac{\rho V^2}{2 g_c C^2} \cdot \frac{1}{144}$$

$$V = \frac{Q}{A}$$

where:
$\Delta P_{gap}$ = pressure drop across port, psi
$\rho$ = stripper gas density, 0.1 lb/ft.$^3$
$V$ = gas velocity through port, ft/sec.
$g_c$ = 32.3 ft/sec.$^2$
$C$ = orifice flow coefficient, ~0.61
$Q$ = stripper gas flow rate, ft.$^3$/sec.
$A$ = port flow area, ft.$^2$ For Example—Case 1: $\Delta P_{gap}$ = 0.1 psi
 riser cyclone inlet flow = 50 ft.$^3$/sec.
  @990° F., 35.1 psig
 Q, stripper gas flow rate = 4 ft$^3$/sec.
  @990° F., 35.1 psig
 From the sharp edge orifice equation:
  A = 0.068 ft.$^2$ @ $\Delta P_{gap}$ = 0.1 psi For a riser inlet flow of 50 ft.$^3$/sec. (actual) the typical velocity is about 65 ft./sec. The required riser outlet area (Ar) is therefore:

$$Ar = \frac{50}{65} \text{ ft.}^2$$

From FIG. 2, Riser diameter(Dr) Dr = 1.15D
Therefore for $\Delta P_{gap}$ = 0.1 psig, the port flow area is 0.0918D$^2$.
Case 2: $\Delta P_{gap}$ = 2.0 psi
 By the same method:
 for $\Delta P_{gap}$ = 2.0 psi, the port flow area is 0.0205D$^2$.

The port also eliminates the need for expansion joints to accommodate thermal expansion. The riser cyclone and secondary cyclone are not attached, and are separated by a gap of about 0.1D. Thermal growth and contraction of the closed cyclone system has been known to distort expansion joints requiring periodic maintenance. The invention eliminates this type of maintenance.

EXAMPLE

Two one-quarter scale FCC cyclone separators and associated equipment were constructed of PLEXIGLAS ® (a transparent shatter resistant acrylate resin). The cyclone separators were arranged in a model reactor vessel in three different configurations to compare separation efficiency, pressure gradient and pressure stability. The three configurations differed in their coupling to a riser reactor and their means of removing stripper gas from the reactor vessel. In all three configurations the first stage cyclone discharged directly into a second stage cyclone, and the second stage cyclone discharged material from the reactor vessel under relative vacuum as would be provided by a vapor recovery system. One ton/minute of FCC catalyst was circulated through the riser reactor cyclone separators and reactor vessel. Compressed air simulated hydrocarbon vapor and air with helium simulated stripper gas. The transparent equipment permitted the viewing and videotaping of flowing FCC catalyst powder in the apparatus.

The first configuration simulated a conventional rough cut cyclone system. The riser cyclone inlet was connected to the riser and the vapor outlet exhausted to the reactor vessel. The second stage cyclone inlet drew feed from the reactor vessel. Both catalyst and air from the riser and air with helium from the stripper were drawn from the reactor vessel into the second stage inlet. This configuration is reported in Comparative Examples 1-11 and 42.

The second configuration simulated the invention. The first stage cyclone was coupled to the riser and drew all catalyst and air directly from the riser. Stripping gas was drawn from the reactor vessel into the first stage via circular ports in the top cover. The ports were arranged in a ring around the outlet conduit and in regard to stripping gas flow approximated the annular port in FIG. 2. Results are reported in inventive Examples 12-29.

The third configuration simulated the method and apparatus of FIG. 3 of each of U.S. Pat. Nos. 4,623,446 and 4,737,346 to J. H. Haddad et al. The first stage cyclone was coupled to the riser and drew all catalyst and air directly from the riser. Stripping gas was drawn from the reactor vessel into the outlet conduit via circumferentially spaced circular ports. Results are reported in Comparative Examples 30-41.

For each configuration catalyst circulation rate, riser air rate, stripper air rate, riser cyclone dipleg diameter and dipleg sealing with catalyst in a catalyst bed were varied to simulate the range of operating conditions in a full scale operating unit. For each Example, catalyst circulation rate, riser air rate, stripper air rate, dipleg catalyst accumulation, pressures and pressure differentials (DP) sufficient to calculate separation efficiency, pressure gradient and pressure stability were recorded at steady state. The simulations were also documented by videotaping through the PLEXIGLAS ®.

The model dimensions are recorded in Table I. Recorded data and calculated results are reported in Table II.

TABLE I

| | |
|---|---|
| Riser diameter | 12 in. |
| First cyclone inlet conduit width and height | 6.75 in. × 16.75 in. |
| First cyclone outlet tube diameter | 12 in. |
| First cyclone barrel diameter | 30 in. |
| First cyclone dipleg diameter | 7 in. or 10 in. |
| Second cyclone dipleg diameter | 3 in. |

TABLE IIa

| | FLOW RATES | | | | |
|---|---|---|---|---|---|
| Ex. | Catalyst Cir. Rate (lb/min) | Riser Gas Rate (ft³/min) | 1st Stage Dipleg OD (in) | 1st Stage Dipleg Seal | Stripping Gas Rate (ft³/min) |
| 1 | 325.0 | 629.3 | 7 | Sealed | 223.4 |
| 2 | 1248.0 | 2000.8 | 7 | Sealed | 223.4 |
| 3 | 2067.0 | 2556.3 | 7 | Sealed | 217.1* |
| 4 | 2925.0 | 2510.8 | 7 | Sealed | 217.1 |
| 5 | 2067.0 | 2532.8 | 7 | Sealed | 217.1 |
| 6 | 2080.0 | 2544.2 | 7 | Unsealed | 217.1 |
| 7 | 2080.0 | 2543.1 | 7 | Sealed | 217.1* |
| 8 | 338.0 | 663.4 | 10 | Sealed | 223.4 |
| 9 | 1300.0 | 1965.8 | 10 | Sealed | 220.3 |
| 10 | 2054.0 | 2484.5 | 10 | Sealed | 217.1* |
| 11 | 2067.0 | 2425.0 | 10 | Unsealed | 217.1 |
| 12 | 338.0 | 646.6 | 10 | Unsealed | 223.4 |
| 13 | 1300.0 | 1967.3 | 10 | Unsealed | 223.4 |

TABLE IIa-continued

| | FLOW RATES | | | | |
|---|---|---|---|---|---|
| Ex. | Catalyst Cir. Rate (lb/min) | Riser Gas Rate (ft³/min) | 1st Stage Dipleg OD (in) | 1st Stage Dipleg Seal | Stripping Gas Rate (ft³/min) |
| 14 | 338.0 | 663.4 | 10 | Unsealed | 223.4 |
| 15 | 1300.0 | 1939.8 | 10 | Unsealed | 223.4 |
| 16 | 2106.0 | 2516.2 | 10 | Unsealed | 220.3* |
| 17 | 2080.0 | 2538.7 | 10 | Unsealed | 220.3* |
| 18 | 312.0 | 663.4 | 10 | Unsealed | 223.4 |
| 19 | 1300.0 | 1922.1 | 10 | Unsealed | 223.4 |
| 20 | 2080.0 | 2478.3 | 10 | Unsealed | 220.3* |
| 21 | 325.0 | 663.4 | 10 | Unsealed | 223.4 |
| 22 | 1300.0 | 1913.1 | 10 | Unsealed | 223.4 |
| 23 | 2080.0 | 2503.8 | 10 | Unsealed | 220.3* |
| 24 | 2080.0 | 2512.3 | 10 | Unsealed | 166.5 |
| 25 | 2080.0 | 2493.8 | 10 | Unsealed | 271.1 |
| 26 | 2015.0 | 2455.3 | 7 | Unsealed | 220.3* |
| 27 | 1300.0 | 1945.2 | 7 | Unsealed | 223.4 |
| 28 | 325.0 | 695.7 | 7 | Unsealed | 223.4 |
| 29 | 2054.0 | 2516.1 | 7 | Unsealed | 220.3* |
| 30 | 325.0 | 663.4 | 7 | Sealed | 223.4 |
| 31 | 1300.0 | 1967.3 | 7 | Sealed | 223.4 |
| 32 | 2080.0 | 2483.4 | 7 | Sealed | 220.3* |
| 33 | 2080.0 | 2490.3 | 7 | Sealed | 166.5 |
| 34 | 2080.0 | 2481.3 | 7 | Sealed | 273.6 |
| 35 | 2080.0 | 2492.5 | 7 | Unsealed | 220.3 |
| 36 | 2080.0 | 2516.5 | 10 | Sealed | 220.3* |
| 37 | 2080.0 | 2497.6 | 10 | Unsealed | 220.3 |
| 38 | 2080.0 | 2506.9 | 10 | Sealed | 220.3* |
| 39 | 2080.0 | 2497.4 | 10 | Sealed | 220.3* |
| 40 | 1300.0 | 1908.5 | 10 | Sealed | 223.4 |
| 41 | 325.0 | 663.4 | 10 | Sealed | 223.4 |
| 42 | 2080.0 | 2506.5 | 10 | Sealed | 220.3 |

TABLE IIb

| | FIRST CYCLONE DIPLEG FLOWS | | | |
|---|---|---|---|---|
| Ex. | Gas Flow Down Dipleg (ft³/min) | Calculated Dipleg Density (lb/ft³) | Gas Flow Down as % of Total Riser Gas | Catalyst Flux (lb/sec-ft²) |
| 1 | — | — | — | 19.6 |
| 2 | — | — | — | 75.1 |
| 3 | 207.90 | 9.94 | 8.13* | 124.4 |
| 4 | — | — | — | 176.1 |
| 5 | — | — | — | 124.4 |
| 6 | 396.90 | 5.24 | 15.60 | 125.2 |
| 7 | 176.64 | 11.78 | 6.95* | 125.2 |
| 8 | — | — | — | 9.8 |
| 9 | — | — | — | 37.8 |
| 10 | 199.50 | 10.30 | 8.03* | 59.7 |
| 11 | 270.80 | 7.63 | 11.17 | 60.1 |
| 12 | — | — | — | 9.8 |
| 13 | 153.36 | 8.48 | 7.80 | 37.8 |
| 14 | — | — | — | 9.8 |
| 15 | 65.73 | 19.78 | 3.39 | 37.8 |
| 16 | 73.29 | 28.74 | 2.91* | 61.3 |
| 17 | 50.40 | 41.27 | 1.99 | 60.5 |
| 18 | — | — | — | 9.1 |
| 19 | 75.75 | 17.16 | 3.94 | 37.8 |
| 20 | 77.24 | 26.93 | 3.12* | 60.5 |
| 21 | — | — | — | 9.5 |
| 22 | 129.42 | 10.05 | 6.76 | 37.8 |
| 23 | 94.92 | 21.91 | 3.79* | 60.5 |
| 24 | 69.42 | 29.96 | 2.76 | 60.5 |
| 25 | 155.74 | 13.26 | 6.25 | 60.5 |
| 26 | 94.60 | 21.30 | 3.85* | 121.3 |
| 27 | 99.71 | 13.04 | 5.13 | 78.3 |
| 28 | 81.57 | 3.98 | 11.72 | 19.6 |
| 29 | 94.92 | 21.64 | 3.77* | 123.6 |
| 30 | — | — | — | 19.6 |
| 31 | — | — | — | 78.3 |
| 32 | 83.91 | 24.79 | 3.38* | 125.2 |
| 33 | 110.70 | 18.79 | 4.45 | 125.2 |
| 34 | 83.91 | 24.79 | 3.38 | 125.2 |
| 35 | 381.18 | 5.46 | 15.29 | 125.2 |
| 36 | 124.99 | 16.64 | 4.97* | 60.5 |
| 37 | 325.47 | 6.39 | 13.03 | 60.5 |
| 38 | 98.14 | 21.19 | 3.91* | 60.5 |

TABLE IIb-continued

FIRST CYCLONE DIPLEG FLOWS

| Ex. | Gas Flow Down Dipleg (ft³/min) | Calculated Dipleg Density (lb/ft³) | Gas Flow Down as % of Total Riser Gas | Catalyst Flux (lb/sec-ft²) |
|---|---|---|---|---|
| 39 | 112.12 | 18.55 | 4.49* | 60.5 |
| 40 | — | — | — | 37.8 |
| 41 | — | — | — | 9.5 |
| 42 | 118.20 | 17.60 | 4.72 | 60.5 |

TABLE IIc

FIRST CYCLONE EFFICIENCY

| Ex. | Total 1st Stage Losses (lb/min) | 1st Stage Efficiency (%) | Avg % for (*) Runs |
|---|---|---|---|
| 1 | — | — | Ex. 1-11 |
| 2 | 15.33 | 98.77 | 99.31% |
| 3 | 23.55 | 98.86* | |
| 4 | 14.59 | 99.50 | |
| 5 | 8.27 | 99.60 | |
| 6 | 10.90 | 99.48 | |
| 7 | 7.51 | 99.64* | |
| 8 | 1.24 | 99.63 | |
| 9 | 7.26 | 99.44 | |
| 10 | 11.55 | 99.44* | |
| 11 | 10.34 | 99.50 | |
| 12 | 6.56 | 98.06 | Ex. 12-29 |
| 13 | 5.84 | 99.55 | 99.68% |
| 14 | 5.19 | 98.46 | |
| 15 | 7.03 | 99.46 | |
| 16 | 5.82 | 99.72* | |
| 17 | 4.91 | 99.76* | |
| 18 | 7.66 | 97.55 | |
| 19 | 7.24 | 99.44 | |
| 20 | 7.27 | 99.65* | |
| 21 | 8.20 | 97.48 | |
| 22 | 9.75 | 99.25 | |
| 23 | 8.59 | 99.59* | |
| 24 | 5.80 | 99.72 | |
| 25 | 10.05 | 99.52 | |
| 26 | 7.01 | 99.65* | |
| 27 | 8.96 | 99.31 | |
| 28 | 7.74 | 97.62 | |
| 29 | 5.65 | 99.72* | |
| 30 | 1.65 | 99.49 | Ex. 30-41 |
| 31 | 3.66 | 99.72 | 99.80% |
| 32 | 4.49 | 99.78* | |
| 33 | 4.04 | 99.81 | |
| 34 | 4.75 | 99.77 | |
| 35 | 4.01 | 99.81 | |
| 36 | 3.47 | 99.83* | |
| 37 | 3.53 | 99.83 | |
| 38 | 4.04 | 99.81* | |
| 39 | 4.96 | 99.76* | |
| 40 | 4.37 | 99.66 | |
| 41 | 1.96 | 99.40 | |
| 42 | 7.40 | 99.64 | |

TABLE IId

FIRST CYCLONE STABILITY

| Ex. | Flow Area for Stripping Gas | DP Through Ports (psi) | Velocity Through Ports (ft/s) | DP Barrel to Rx (psi) | DP Outlet Tube (psi) |
|---|---|---|---|---|---|
| 1 | — | — | — | positive | — |
| 2 | — | — | — | positive | — |
| 3 | — | — | — | positive | — |
| 4 | — | — | — | positive | — |
| 5 | — | — | — | positive | — |
| 6 | — | — | — | positive | — |
| 7 | — | — | — | positive | — |
| 8 | — | — | — | positive | — |
| 9 | — | — | — | positive | — |
| 10 | — | — | — | positive | — |
| 11 | — | — | — | positive | — |
| 12 | 0.0298 | 0.123 | 67.45 | −0.12 | — |
| 13 | 0.0298 | 0.173 | 80.14 | −0.17 | — |
| 14 | 0.0298 | 0.130 | 69.40 | −0.13 | — |
| 15 | 0.0298 | 0.166 | 78.45 | −0.17 | — |
| 16 | 0.0298 | 0.186 | 83.01 | −0.19 | — |
| 17 | 0.0298 | 0.190 | 83.81 | −0.19 | — |
| 18 | 0.0192 | 0.162 | 77.60 | −0.16 | — |
| 19 | 0.0192 | 0.334 | 111.25 | −0.33 | — |
| 20 | 0.0192 | 0.325 | 109.74 | −0.32 | — |
| 21 | 0.0107 | 0.280 | 101.83 | −0.28 | — |
| 22 | 0.0107 | 0.514 | 138.08 | −0.51 | — |
| 23 | 0.0107 | 0.578 | 146.32 | −0.58 | — |
| 24 | 0.0107 | 0.352 | 114.22 | −0.35 | — |
| 25 | 0.0107 | 0.686 | 159.45 | −0.69 | — |
| 26 | 0.0107 | 0.903 | 182.90 | −0.90 | — |
| 27 | 0.0107 | 0.794 | 171.57 | −0.79 | — |
| 28 | 0.0107 | 0.560 | 144.01 | −0.56 | — |
| 29 | 0.0107 | 0.343 | 112.75 | −0.34 | — |
| 30 | 0.0764 | 0.049 | 42.61 | −0.03 | 0.011 |
| 31 | 0.0764 | 0.098 | 60.25 | −0.02 | 0.049 |
| 32 | 0.0764 | 0.147 | 73.80 | −0.00 | 0.074 |
| 33 | 0.0764 | 0.073 | 52.18 | 0.01 | 0.090 |
| 34 | 0.0764 | 0.098 | 60.25 | −0.01 | 0.123 |
| 35 | 0.0764 | 0.147 | 73.80 | −0.01 | 0.072 |
| 36 | 0.0764 | 0.122 | 67.37 | 0.00 | 0.094 |
| 37 | 0.0764 | 0.147 | 73.80 | −0.03 | 0.081 |
| 38 | 0.0545 | 0.147 | 73.80 | −0.04 | 0.112 |
| 39 | 0.7909 | 0.049 | 42.61 | 0.03 | 0.051 |
| 40 | 0.7909 | 0.049 | 42.61 | 0.04 | 0.070 |
| 41 | 0.7909 | 0.024 | 30.13 | −0.01 | 0.022 |
| 42 | — | — | — | positive | — |

The Examples of most commercial significance are identified with an asterisk (*). These data are the examples of both high catalyst circulation rate and high riser air rate. They most closely simulate typical daily operation on a commercial unit. Separation efficiency is the amount of catalyst which leaves the cyclone via the dipleg expressed as a percentage of total catalyst. The separation efficiency for the average of these high rate examples from Table IIc was as follows:

| | |
|---|---|
| Examples 1-11 and 42 | 99.31% |
| Examples 12-29 | 99.68% |
| Examples 30-41 | 99.80% |

The next parameter of interest is the pressure stability of the cyclone. The pressure of the cyclone reported is the pressure relative to the surrounding reactor vessel (Rx). The results from Table IId were as follows:

| | DP Barrel To Rx Pressure Range, psi |
|---|---|
| Examples 1-11 and 42 | always positive |
| Examples 12-29 | −0.12 to −0.90 |
| Examples 30-41 | −0.04 to +0.04 |

The first cyclone of Examples 12-29 is inherently at negative pressure to the reactor vessel. The inherent negative pressure is defined herein as cyclone stability. Stripper gas always flows into the cyclone. Riser gas never flows into the reactor vessel. That is, reactor pressure is maintained at a pressure greater than the vapor recovery pressure. Switching from negative to positive pressure and back is prevented.

The cyclone of Examples 30–41 swings between positive and negative pressure. At negative pressure, stripper gas flows into the cyclone. At positive pressure, riser gas flows into the reactor. The flow direction of gases switches with the pressure swing from positive to negative and back. This pressure swing from negative to positive and back is referred to as unstable.

While particular embodiments of the invention have been described, it will be understood, of course, that the invention is not limited thereto since many modifications may be made, and it is, therefore, contemplated to cover by the appended claims any such modification as fall within the true spirit and scope of the invention. For example materials of construction for the riser cyclone apparatus are conventional. Carbon steel is typically used. Stainless steel may be used if temperature severity requires it.

What is claimed is:

1. An apparatus for the fluid catalytic cracking of a hydrogen feedstock in a closed cyclone system, said apparatus comprising:
   a reactor vessel;
   a vertically elongated riser reactor having an upstream end and a downstream end, said downstream end terminating within said reactor vessel;
   means defining a catalyst stripper within said reactor vessel;
   a first conduit directly connecting the downstream end of said riser reactor to a riser cyclone separator within said reactor vessel,
   said riser cyclone separator consisting of:
   a vertically elongated cylindrical barrel,
   an inlet conduit oriented for tangential discharge into said barrel comprising an upper end and a lower end,
   a vertically oriented inverted right circular conical member comprising an upper base end and a lower truncated apex end, said base end axially attached to said barrel lower end and said apex end attached to and in fluid communication with a vertically elongated catalyst dipleg, a barrel top cover attached to said barrel upper end,
   and a vertically oriented outlet conduit axially aligned with said barrel and transversing said barrel top cover, and a port in said barrel top cover through which said outlet conduit passes providing an annular gap between said barrel top cover and said outlet conduit, and
   exit means attached to said outlet conduit, providing fluid communication out of said reactor vessel.

2. The apparatus of claim 1 wherein said exit means comprises a secondary cyclone separator.

3. The apparatus of claim 1 wherein said outlet conduit is cylindrical and has a diameter D and said gap has a flow area of $0.01D^2$ to $0.1D^2$.

4. The apparatus of claim 1 wherein said outlet conduit is cylindrical and has a diameter D and said gap has a flow area of $0.02D^2$ to $0.09D^2$.

5. In a fluid catalytic cracking process comprising:
   contacting a hydrocarbon feedstock with fluidized cracking catalyst in a riser conversion zone at catalytic reaction temperature and riser reaction pressure thereby yielding a reaction mixture;
   discharging said reaction mixture directly from said riser conversion zone into a closed coupled riser cyclone separation zone at a separation pressure, said separation pressure at a pressure less than said riser reaction pressure, said coupled riser cyclone separation zone contained within a reactor vessel at a reactor vessel pressure;
   cyclonically separating said reaction mixture thereby yielding a cracked hydrocarbon vapor and a coked cracking catalyst;
   passing said coked cracking catalyst to a stripping zone contained within said reactor vessel and contacting said coked cracking catalyst with a fresh stripping gas and separating to yield stripped catalyst and spent stripping gas;
   withdrawing said stripped catalyst from said reactor vessel;
   passing said cracked hydrocarbon from said closed coupled riser cyclone separation zone to a vapor recovery zone at a vapor recovery pressure below said reaction pressure;
   wherein the improvement comprises:
   passing said spend stripping gas directly from said stripping zone into said closed coupled riser cyclone separation zone and therein combining with said cracked hydrocarbon vapor, in the absence of contacting said spent stripping gas with said riser reaction mixture or said coked cracking catalyst,
   thereby both (i) maintaining each of said separation pressure and said reactor vessel pressure at a pressure greater than said vapor recovery pressure and (ii) maintaining said separation pressure at a pressure less than said reactor vessel pressure.

6. The process of claim 5 wherein said riser reaction pressure is 5 to 45 psig.

7. The process of claim 5 wherein said riser reaction pressure is 10 to 30 psig.

8. The process of claim 5 wherein said recovery pressure is 0.5 to 10 psig.

9. The process of claim 5 wherein said recovery pressure is 2 to 5 psig.

10. The process of claim 5 wherein said riser reaction pressure is 10 to 30 psig and said recovery pressure is 2 to 5 psig.

* * * * *

UNITED STATES PATENT AND TRADEMARK OFFICE
CERTIFICATE OF CORRECTION

PATENT NO. : 5,248,411
DATED : September 28, 1993
INVENTOR(S) : Ting Yee Chan

It is certified that error appears in the above-identified patent and that said Letters Patent is hereby corrected as shown below:

In column 11, line 20, please substitute --hydrocarbon-- for "hydrogen".

In column 12, line 16, after "said" insert --closed--.

Signed and Sealed this

Fifth Day of April, 1994

Attest:

BRUCE LEHMAN

Attesting Officer

Commissioner of Patents and Trademarks